US012562390B2

(12) United States Patent
Sohn et al.

(10) Patent No.: US 12,562,390 B2
(45) Date of Patent: Feb. 24, 2026

(54) ELECTRODE ASSEMBLY AND LITHIUM BATTERY COMPRISING SAME

(71) Applicant: SAMSUNG SDI CO., LTD., Yongin-si (KR)

(72) Inventors: Juhee Sohn, Yongin-si (KR); Junggyu Nam, Yongin-si (KR); Junwon Suh, Yongin-si (KR); Jungyup Yang, Yongin-si (KR); Hyeri Eom, Yongin-si (KR); Jeongdoo Yi, Yongin-si (KR); Daun Han, Yongin-si (KR); Juhyeong Han, Yongin-si (KR); Seokhun Hong, Yongin-si (KR); Jandee Kim, Yongin-si (KR); Bongkyoung Park, Yongin-si (KR); Hyunhwa Song, Yongin-si (KR); Sol Choi, Yongin-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 0 days.

(21) Appl. No.: 18/531,894

(22) Filed: Dec. 7, 2023

(65) Prior Publication Data

US 2024/0120498 A1      Apr. 11, 2024

Related U.S. Application Data

(63) Continuation of application No. 16/491,038, filed as application No. PCT/KR2018/002239 on Feb. 23, 2018, now Pat. No. 11,870,079.

(30) Foreign Application Priority Data

Mar. 9, 2017    (KR) ........................ 10-2017-0030270

(51) Int. Cl.
H01M 10/052      (2010.01)
H01M 4/74      (2006.01)
H01M 10/0585      (2010.01)

(52) U.S. Cl.
CPC .......... H01M 4/74 (2013.01); H01M 10/052 (2013.01); H01M 10/0585 (2013.01)

(58) Field of Classification Search
CPC ... H01M 4/74; H01M 10/052; H01M 10/0585
See application file for complete search history.

(56) References Cited

U.S. PATENT DOCUMENTS

| 8,166,635 B2 | 5/2012 | Nagai et al. |
| 8,168,317 B2 | 5/2012 | Yoon et al. |

(Continued)

FOREIGN PATENT DOCUMENTS

| CN | 1542995 A | 11/2004 |
| CN | 1581545 A | 2/2005 |

(Continued)

OTHER PUBLICATIONS

International Search Report dated Jun. 4, 2018.

(Continued)

*Primary Examiner* — Osei K Amponsah
(74) *Attorney, Agent, or Firm* — Lee IP Law, P.C.

(57)      ABSTRACT

Provided is a stacked electrode assembly including: a lowermost electrode arranged on a lowermost portion of the stacked electrode assembly; an uppermost electrode arranged on an uppermost portion of the stacked electrode assembly; at least one unit stacked body arranged between the lowermost electrode and the uppermost electrode and including a positive electrode, a negative electrode, and a separator, the separator being arranged between the positive electrode and the negative electrode; and a separator arranged between the lowermost electrode and the at least one unit stacked body, and between the at least one unit stacked body and the uppermost electrode. A capacity and energy density of a lithium battery may be improved by employing an electrode including a mesh electrode current (Continued)

100 collector as the lowermost electrode or the uppermost electrode of the stacked electrode assembly.

20 Claims, 15 Drawing Sheets

(56) References Cited

U.S. PATENT DOCUMENTS

| | | | |
|---|---|---|---|
| 8,383,262 B2 | 2/2013 | Park et al. | |
| 8,574,743 B2 | 11/2013 | Kim et al. | |
| 8,785,040 B2 | 7/2014 | Choi et al. | |
| 8,945,744 B2 | 2/2015 | Kwon et al. | |
| 9,236,631 B2 | 1/2016 | Kwon et al. | |
| 9,252,452 B2 | 2/2016 | Kwon et al. | |
| 9,263,760 B2 | 2/2016 | Kwon et al. | |
| 9,318,733 B2 | 4/2016 | Kwon et al. | |
| 9,325,032 B2 | 4/2016 | Park et al. | |
| 9,379,418 B2 | 6/2016 | Wang et al. | |
| 9,431,674 B2 | 8/2016 | Kwon et al. | |
| 9,431,679 B2 | 8/2016 | Kwon et al. | |
| 9,484,593 B2 | 11/2016 | Park et al. | |
| 9,496,542 B2 | 11/2016 | Roh et al. | |
| 9,627,708 B2 | 4/2017 | Kwon et al. | |
| 9,660,296 B2 | 5/2017 | Kim et al. | |
| 9,666,909 B2 | 5/2017 | Lee et al. | |
| 9,692,027 B2 | 6/2017 | Park et al. | |
| 9,871,241 B2 | 1/2018 | Kwon et al. | |
| 9,929,439 B2 | 3/2018 | Kwon et al. | |
| 9,947,909 B2 | 4/2018 | Park et al. | |
| 10,147,924 B2 | 12/2018 | Deschamps | |
| 10,516,185 B2 | 12/2019 | Park et al. | |
| 2003/0104270 A1* | 6/2003 | Rubino | H01M 4/136 |
| | | | 429/52 |
| 2005/0026034 A1 | 2/2005 | Masuyoshi et al. | |
| 2007/0231698 A1 | 10/2007 | Kawase et al. | |
| 2009/0029257 A1 | 1/2009 | Ando et al. | |
| 2009/0246629 A1 | 10/2009 | Nagai et al. | |
| 2010/0285356 A1 | 11/2010 | Choi et al. | |
| 2011/0117438 A1* | 5/2011 | Han | H01M 10/0413 |
| | | | 429/246 |
| 2012/0251871 A1 | 10/2012 | Suzuki et al. | |
| 2013/0004844 A1 | 1/2013 | Hosoe et al. | |
| 2015/0255775 A1 | 9/2015 | Kwon et al. | |
| 2016/0372780 A1 | 12/2016 | Sohn et al. | |
| 2018/0034038 A1 | 2/2018 | Rogren | |
| 2019/0148777 A1 | 5/2019 | Kwon et al. | |

FOREIGN PATENT DOCUMENTS

| | | | |
|---|---|---|---|
| CN | 1992394 A | 7/2007 | |
| CN | 101047236 A | 10/2007 | |
| CN | 101350432 A | 1/2009 | |
| CN | 101546649 A | 9/2009 | |
| CN | 101882676 A | 11/2010 | |
| CN | 102064310 A | 5/2011 | |
| CN | 102906901 A | 1/2013 | |
| CN | 103348518 A | 10/2013 | |
| CN | 103959541 A | 7/2014 | |
| CN | 105308786 A | 2/2016 | |
| CN | 106257723 A | 12/2016 | |
| CN | 106469825 A | 3/2017 | |
| JP | 2005-011556 A | 1/2005 | |
| JP | 2010-015974 A | 1/2010 | |
| JP | 2015-149463 A | 8/2015 | |
| KR | 10-2006-0122344 A | 11/2006 | |
| KR | 10-2007-0020597 A | 2/2007 | |
| KR | 10-2007-0118715 A | 12/2007 | |
| KR | 10-2008-0005629 A | 1/2008 | |
| KR | 10-2008-0005631 A | 1/2008 | |
| KR | 10-2008-0006819 A | 1/2008 | |
| KR | 10-2008-0009349 A | 1/2008 | |
| KR | 10-2008-0036250 A | 4/2008 | |
| KR | 10-2008-0072112 A | 8/2008 | |
| KR | 10-2008-0095967 A | 10/2008 | |
| KR | 10-2008-0107047 A | 12/2008 | |
| KR | 10-2009-0008075 A | 1/2009 | |
| KR | 10-2009-0095525 A | 9/2009 | |
| KR | 10-2009-0103838 A | 10/2009 | |
| KR | 10-2010-0005810 A | 1/2010 | |
| KR | 10-2010-0032053 A | 3/2010 | |
| KR | 10-2010-0051353 A | 5/2010 | |
| KR | 10-2010-0071786 A | 6/2010 | |
| KR | 10-2011-0037998 A | 4/2011 | |
| KR | 10-2011-0053899 A | 5/2011 | |
| KR | 10-1049826 B1 | 7/2011 | |
| KR | 10-2012-0061354 A | 6/2012 | |
| KR | 10-2012-0137289 A | 12/2012 | |
| KR | 10-2013-0012547 A | 2/2013 | |
| KR | 10-2013-0104544 A | 9/2013 | |
| KR | 10-2013-0106781 A | 9/2013 | |
| KR | 10-2013-0118767 A | 10/2013 | |
| KR | 10-2013-0118768 A | 10/2013 | |
| KR | 10-2013-0118769 A | 10/2013 | |
| KR | 10-2013-0122550 A | 11/2013 | |
| KR | 10-2013-0132230 A | 12/2013 | |
| KR | 10-2013-0132231 A | 12/2013 | |
| KR | 10-2013-0132341 A | 12/2013 | |
| KR | 10-2013-0132342 A | 12/2013 | |
| KR | 10-2013-0135017 A | 12/2013 | |
| KR | 10-2013-0135204 A | 12/2013 | |
| KR | 10-2013-0137112 A | 12/2013 | |
| KR | 10-2014-0032601 A | 3/2014 | |
| KR | 10-2014-0034340 A | 3/2014 | |
| KR | 10-2014-0041644 A | 4/2014 | |
| KR | 10-2014-0062445 A | 5/2014 | |
| KR | 10-2014-0062568 A | 5/2014 | |
| KR | 10-2014-0065053 A | 5/2014 | |
| KR | 10-2014-0086782 A | 7/2014 | |
| KR | 10-2014-0087966 A | 7/2014 | |
| KR | 10-2014-0088677 A | 7/2014 | |
| KR | 10-2014-0101510 A | 8/2014 | |
| KR | 10-2014-0101649 A | 8/2014 | |
| KR | 10-2014-0103085 A | 8/2014 | |
| KR | 10-1431278 B1 | 8/2014 | |
| KR | 10-2014-0113319 A | 9/2014 | |
| KR | 10-2014-0122814 A | 10/2014 | |
| KR | 10-2014-0146935 A | 12/2014 | |
| KR | 10-2015-0006387 A | 1/2015 | |
| KR | 10-2015-0029228 A | 3/2015 | |
| KR | 10-2015-0033340 A | 4/2015 | |
| KR | 10-2015-0033360 A | 4/2015 | |
| KR | 10-2015-0033379 A | 4/2015 | |
| KR | 10-2015-0033380 A | 4/2015 | |
| KR | 10-2015-0033395 A | 4/2015 | |
| KR | 10-2015-0033854 A | 4/2015 | |
| KR | 10-2015-0034366 A | 4/2015 | |
| KR | 10-2015-0034477 A | 4/2015 | |
| KR | 10-2015-0041291 A | 4/2015 | |
| KR | 10-2015-0043704 A | 4/2015 | |
| KR | 10-2015-0043721 A | 4/2015 | |
| KR | 10-2015-0043739 A | 4/2015 | |
| KR | 10-2015-0050131 A | 5/2015 | |
| KR | 10-2015-0059996 A | 6/2015 | |
| KR | 10-2015-0060106 A | 6/2015 | |
| KR | 10-2015-0060108 A | 6/2015 | |
| KR | 10-2016-0149509 A | 12/2016 | |
| TW | 201430170 A | 8/2014 | |
| WO | WO 2016-197006 A1 | 12/2016 | |

OTHER PUBLICATIONS

Korean Notice of Allowance dated Mar. 16, 2021.
Chinese Office action dated Mar. 1, 2022.
Chinese Office action dated Sep. 27, 2022.

* cited by examiner

ELECTRODE ASSEMBLY AND LITHIUM BATTERY COMPRISING SAME

CROSS REFERENCE TO RELATED APPLICATIONS

This is a continuation application based on pending application Ser. No. 16/491,038, filed Sep. 4, 2019, the entire contents of which is hereby incorporated by reference. application Ser. No. 16/491,038 is the U.S. national phase application based on PCT Application No. PCT/KR2018/002239, filed Feb. 23, 2018, which is based on Korean Patent Application No. 10-2017-0030270, filed Mar. 9, 2017, the entire contents of all of which are hereby incorporated by reference.

TECHNICAL FIELD

The present disclosure relates to an electrode assembly and a lithium battery including the same.

BACKGROUND ART

Unlike the primary battery which is generally not rechargeable, a secondary battery is referred to as a rechargeable battery and has been widely used in the field of compact high-tech electronic apparatuses including digital cameras, mobile apparatuses, and notebook computers. A medium and large-scale battery is also under development, and particularly, with distribution of an electric vehicle (EV), a high-capacity safe secondary battery is under development.

Examples of a secondary battery include a nickel-cadmium battery, a nickel-metal hydride battery, a nickel-hydride battery, and a lithium secondary battery. Among these batteries, a lithium secondary battery may be used for a high-power EV by connecting several batteries in series. Since a lithium secondary battery has a high operation voltage and an excellent energy density characteristic per unit weight compared to a nickel-cadmium battery or a nickel-metal hydride battery, use of a lithium secondary battery gradually increases.

Therefore, there is a demand for a lithium secondary battery representing a high capacity and having a high energy density.

DESCRIPTION OF EMBODIMENTS

Technical Problem

Provided is a stacked electrode assembly in which an electrode including a mesh electrode current collector is arranged on an uppermost portion and/or a lowermost portion of the electrode assembly.

Provided is a lithium battery having a high capacity and a high energy density by employing the stacked electrode assembly.

Solution to Problem

According to an aspect of the present disclosure,
a stacked electrode assembly includes:
a lowermost electrode arranged on a lowermost portion of the stacked electrode assembly;
an uppermost electrode arranged on an uppermost portion of the stacked electrode assembly;

at least one unit stacked body arranged between the lowermost electrode and the uppermost electrode and including a positive electrode, a negative electrode, and a separator, the separator being arranged between the positive electrode and the negative electrode; and
a separator arranged between the lowermost electrode and the at least one unit stacked body, and between the at least one unit stacked body and the uppermost electrode,
wherein the lowermost electrode or the uppermost electrode includes an electrode including a mesh electrode current collector.

According to another aspect of the present disclosure, a lithium battery includes the stacked electrode assembly.

Advantageous Effects of Disclosure

The lithium battery according to an embodiment may have an increased capacity and an improved energy density by including a stacked electrode assembly in which an electrode including a mesh electrode current collector is arranged on an uppermost portion and/or a lowermost portion of the stacked electrode assembly.

BEST MODE

Figure 1:
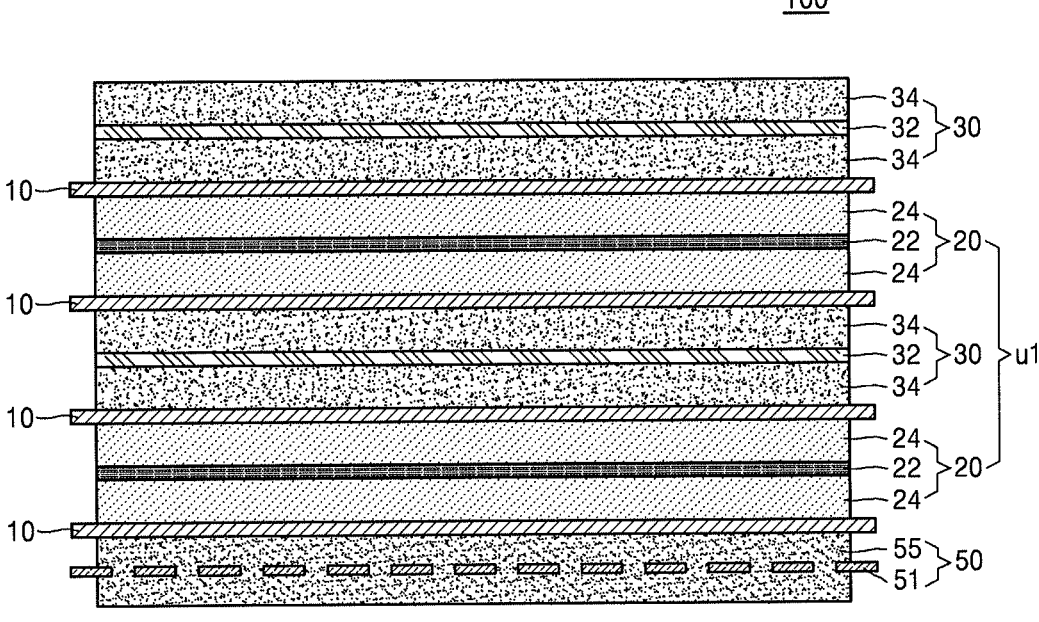
FIGS. 1 to 4 are cross-sectional views of electrode assemblies according to different embodiments.

According to an aspect of the present disclosure,
a stacked electrode assembly includes:
a lowermost electrode arranged on a lowermost portion of the stacked electrode assembly;
an uppermost electrode arranged on an uppermost portion of the stacked electrode assembly;
at least one unit stacked body arranged between the lowermost electrode and the uppermost electrode and including a positive electrode, a negative electrode, and a separator, the separator being arranged between the positive electrode and the negative electrode; and
a separator arranged between the lowermost electrode and the at least one unit stacked body, and between the at least one unit stacked body and the uppermost electrode, wherein the lowermost electrode or the uppermost electrode includes an electrode including a mesh electrode current collector. Both the lowermost electrode and the uppermost electrode may include an electrode including the mesh electrode current collector.

The electrode including the mesh electrode current collector may further include an electrode active material located on one side of the mesh electrode current collector.

The electrode including the mesh electrode current collector may further include an electrode active material located on two opposite sides of the mesh electrode current collector.

The electrode including the mesh electrode current collector may have an asymmetric shape in which a thickness of an electrode active material located on one side thereof is different from a thickness of an electrode active material located on another side thereof.

The electrode including the mesh electrode current collector may further include an electrode active material located inside an opening of the mesh electrode current collector.

An electrode not including the mesh electrode current collector may include a non-porous electrode current collector and an electrode active material arranged on at least one side of the non-porous electrode current collector.

The at least one unit stacked body may have a bi-cell structure stacked in a sequence of a negative electrode, a separator, a positive electrode, a separator, and a negative electrode (or a sequence of a positive electrode, a separator, a negative electrode, a separator, and a positive electrode).

The mesh electrode current collector may have a metal mesh shape in which a plurality of openings are arranged in a two-dimension.

The mesh electrode current collector may include at least one of Al, Ti, V, Cr, Mn, Fe, Co. Ni, Cu, Zn, Zr, Nb, Ag, W, Pt, steel use stainless (SUS), and a combination thereof.

A thickness of the mesh electrode current collector may be 10 µm to 500 µm.

The electrode including the mesh electrode current collector may include an electrode active material located on one side of the mesh electrode current collector, and the number of openings (ppi) of the mesh electrode current collector may be 30 or more per inch or an aperture ratio of the mesh electrode current collector may be 40% or less.

The electrode including the mesh electrode current collector may include an electrode active material located on two opposite sides of the mesh electrode current collector, and the number of openings (ppi) of the mesh electrode current collector may be 30 or less per inch or an aperture ratio of the mesh electrode current collector may be 40% or more.

According to another aspect of the present disclosure, a lithium battery includes the stacked electrode assembly.

Mode of Disclosure

As the disclosure allows for various changes and numerous embodiments, example embodiments will be illustrated in the drawings and described in detail in the written description. However, this is not intended to limit the present disclosure to a particular embodiment and it should be understood that all changes, equivalents, and substitutes included in the spirit and the scope of the present disclosure are included in the present disclosure. In the description of the present disclosure, certain detailed explanations of the related art are omitted when it is deemed that they may unnecessarily obscure the essence of the present disclosure.

It will be understood that although the terms "first", "second", etc. may be used herein to describe various components, these components should not be limited by these terms. These terms are only used to distinguish one component from another. The terms used in the present specification are merely used to describe exemplary embodiments, and are not intended to limit the present disclosure. An expression used in the singular encompasses the expression of the plural, unless it has a clearly different meaning in the context. In the present specification, it is to be understood that the terms such as "including," "having," and "comprising" are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added. As used therein, "/" may be interpreted as "and", or interpreted as "or" depending on a case.

In the drawings, a thickness is enlarged so as to clearly express a plurality of layers and regions. Throughout the specification, like reference numerals are used for similar elements. It will be understood that when a layer, region, or component is referred to as being "formed on," another layer, region, or component, it can be directly or indirectly formed on the other layer, region, or component.

Hereinafter, the disclosure will be described more fully with reference to the accompanying drawings, in which example embodiments of the disclosure are shown. When description is made with reference to the drawings, like reference numerals in the drawings denote like or corresponding elements, and repeated description thereof will be omitted. In the drawings, a thickness is enlarged so as to clearly express a plurality of layers and regions. Sizes of some of layers and regions in the drawings may be exaggerated for convenience of explanation.

Generally, a lithium battery is completed by inserting an electrode assembly to a case having a square shape, a cylindrical shape, a pouch shape, etc., and then injecting an electrolyte. The electrode assembly may be classified into a jelly-roll type (winding type) and a stacked type depending on a structure thereof, the jelly-roll type winding long sheet positive electrode and negative electrode with a separator therebetween, and the stacked type sequentially stacking a plurality of positive and negative electrodes having a predetermined size with a separator therebetween.

In the stacked electrode assembly, an electrode located on an outermost portion, that is, an uppermost portion or a lowermost portion includes a non-reaction area in which intercalation/deintercalation of lithium ion does not occur and thus an irreversible capacity may increase. Since an increase of an irreversible capacity deteriorates a life characteristic of a lithium battery, minimization of an irreversible capacity is required.

As a result of reviewing a method that may minimize an irreversible capacity, it is revealed that a battery may be implemented, the battery reducing an irreversible capacity and increasing an energy density by making an uppermost and/or lowermost electrode of the stacked electrode assembly different from electrodes located inside the stacked electrode assembly.

Hereinafter, the present disclosure is described in detail.

A stacked electrode assembly according to an aspect of the present disclosure includes:

a lowermost electrode arranged on a lowermost portion of the electrode assembly; an uppermost electrode arranged on an uppermost portion of the electrode assembly; at least one unit stacked body arranged between the lowermost electrode and the uppermost electrode, and including a positive electrode, a negative electrode, and a separator, the separator being arranged between the positive electrode and the negative electrode; and a separator arranged between the lowermost electrode and the at least one unit stacked body, and between the at least one unit stacked body and the uppermost electrode, wherein the lowermost electrode or the uppermost electrode includes an electrode including a mesh electrode current collector.

Here, the electrode may be a positive electrode or a negative electrode, and electrodes sequentially stacked around the separator may have different polarities. In other words, the electrode assembly may have a structure stacked in a sequence of a positive electrode, a separator, and a negative electrode (or a sequence of a negative electrode, a separator, and a positive electrode).

For example, both the lowermost electrode and the uppermost electrode may be electrodes including the mesh electrode current collector.

The electrode including the mesh electrode current collector in the electrode assembly may further include an electrode active material located inside an opening of the mesh electrode current collector.

Here, the mesh electrode current collector is discriminated from a plain current collector such as a foil-shaped thin plate. The mesh electrode current collector denotes a current collector including a plurality of openings arranged two-dimensionally inside a sheet-type base material. The electrode including the mesh electrode current collector may have a structure in which an electrode active material is located inside an opening of the mesh electrode current collector.

Other electrodes except the electrode including the mesh electrode current collector in the electrode assembly may include a non-porous electrode current collector, for example, a non-porous electrode current collector such as a metal thin plate, and an electrode active material arranged on at least one side of the non-porous electrode current collector. That is, in the electrode not including the mesh electrode current collector, an electrode active material and a current collector are sequentially stacked, and the electrode not including the mesh electrode current collector has a boundary by which the electrode active material and the current collector are clearly distinguished in the stacking sequence. Therefore, a structure of the electrode not including the mesh electrode current collector is different from a structure of the electrode including the mesh electrode current collector in which a negative electrode active material or a positive electrode active material is located inside an opening of the mesh electrode current collector.

In the case of a stacked electrode assembly including only an electrode not including the mesh electrode current collector, an irreversible capacity increases due to a lowermost electrode or an uppermost electrode as described above. Therefore, to solve this issue, it may be considered to use an electrode in which an active material is not arranged on a lowermost portion or an uppermost portion thereof, that is, to use an electrode in which an active material is arranged on only one side of a current collector. However, an electrode in which an active material is arranged on only one side of the current collector may have a bending phenomenon in which a polar plate is bent during a rolling process.

In contrast, in a battery that employs an electrode including a mesh electrode current collector as a lowermost electrode or an uppermost electrode, the polar plate bending phenomenon may not occur and capacity reduction by an uppermost electrode or a lowermost electrode may not occur. Therefore, compared to a battery that employs a stacked electrode assembly including only an electrode not including the mesh electrode current collector, a capacity and an energy density of the battery that employs an electrode including a mesh electrode current collector may be increased.

The unit stacked body may have a full-cell structure stacked in a sequence of a positive electrode, a separator, and a negative electrode (or a negative electrode, a separator, and a positive electrode).

In another embodiment, the unit stacked body may have a bi-cell structure stacked in a sequence of a negative electrode, a separator, a positive electrode, a separator, and a negative electrode (or a positive electrode, a separator, a negative electrode, a separator, and a positive electrode).

Hereinafter, embodiments are described in more detail with reference to the drawings.

Figure 2:
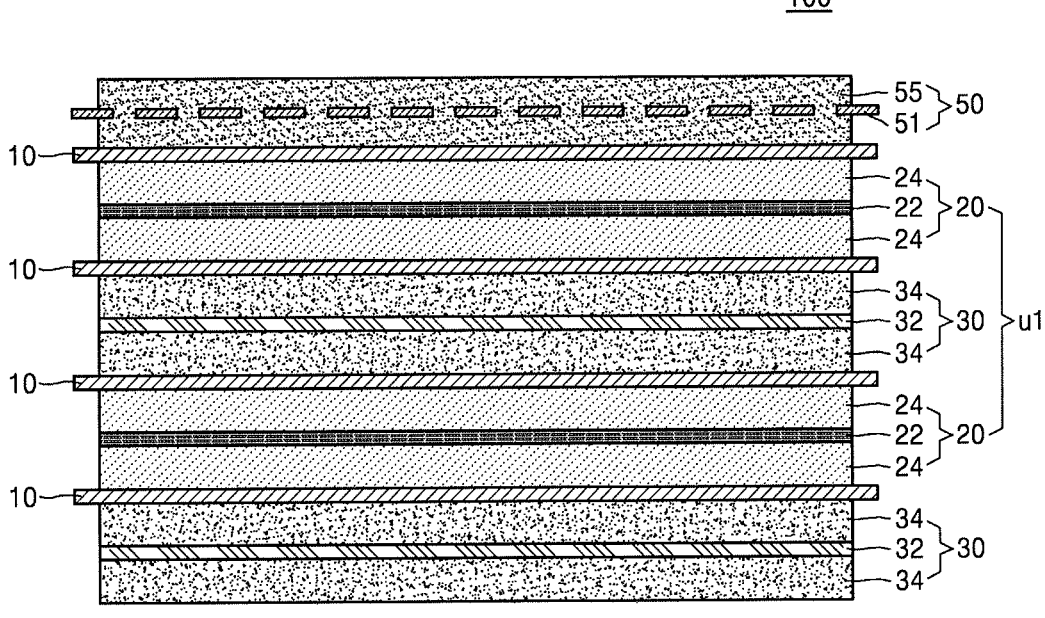
Figure 3:
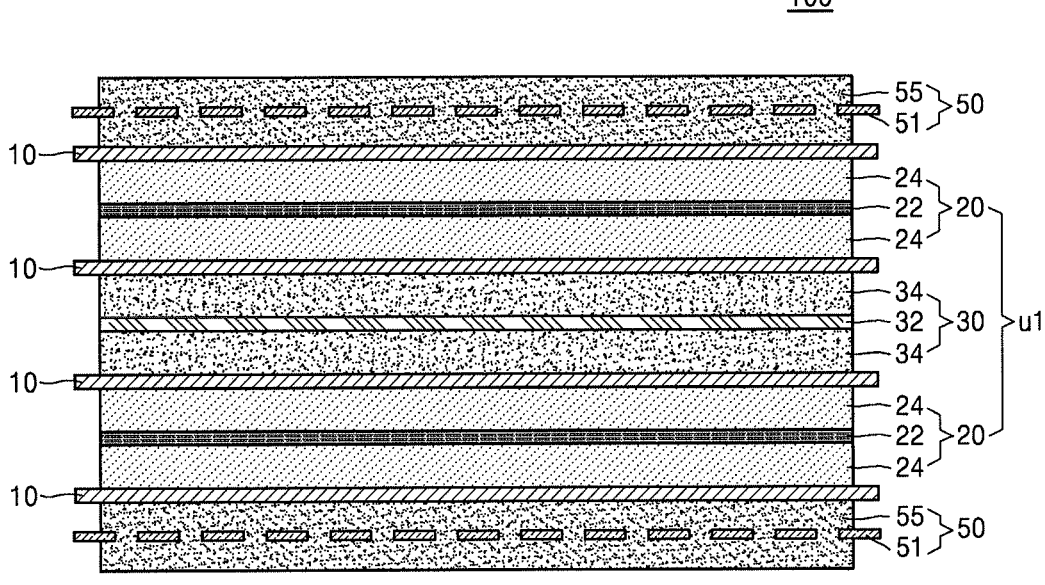
Figure 4:
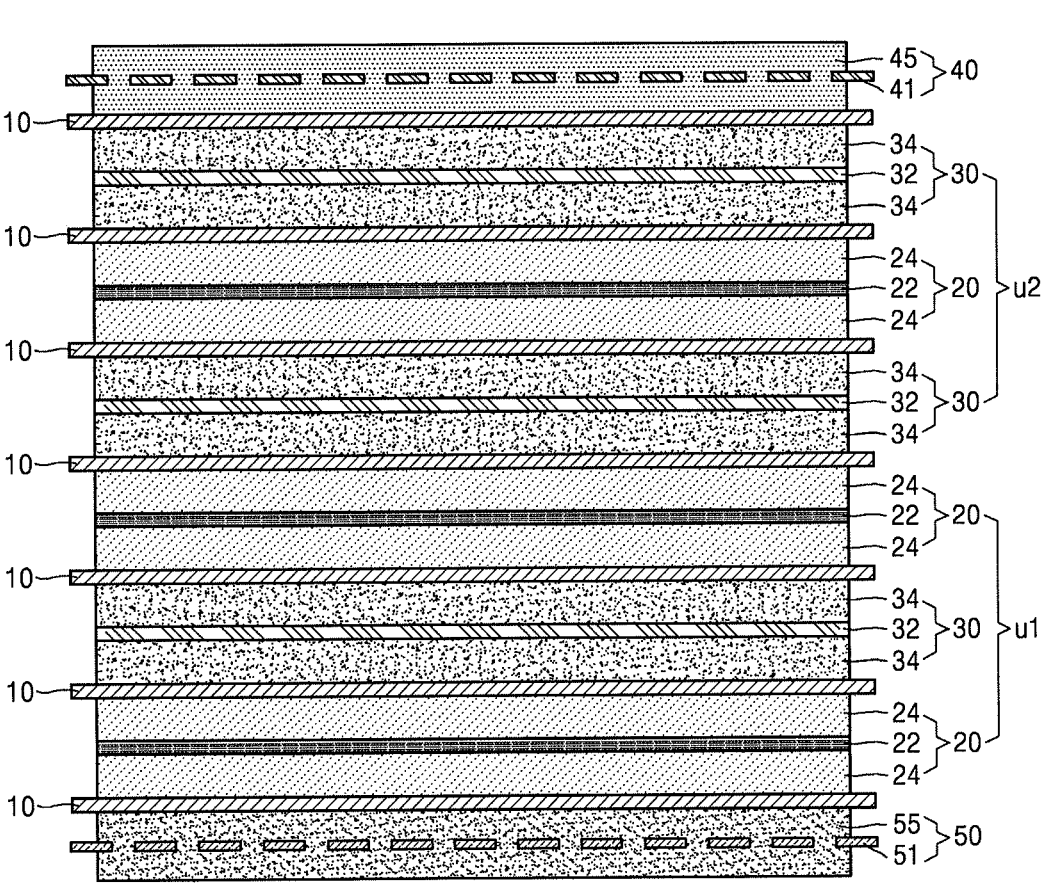

FIGS. 1 to 4 are cross-sectional views of a stacked electrode assembly 100 according to an embodiment. Referring to FIGS. 1 to 3, the electrode assembly 100 includes a lowermost electrode, an uppermost electrode, and one unit stacked body u1 arranged between the lowermost electrode and the uppermost electrode. Referring to FIG. 4, the electrode assembly 100 includes a lowermost electrode, an uppermost electrode, and two unit stacked bodies u1 and u2 arranged between the lowermost electrode and the uppermost electrode.

As shown in FIG. 1, the lowermost electrode of the electrode assembly 100 may be a negative electrode 50 including a mesh electrode current collector 51. The electrode assembly 100 may have a structure in which the negative electrode 50, a separator 10, the unit stacked body u1, the separator 10, and a negative electrode 30 are sequentially stacked, the negative electrode 50 including the mesh electrode current collector 51, and the unit stacked body u1 including a positive electrode 20, the separator 10, the negative electrode 30, the separator 10, and the positive electrode 20 that are sequentially stacked.

Also, though not shown in the present specification, the electrode assembly 100 may also have a structure in which the positive electrode 40, the separator 10, the unit stacked body u1, the separator 10, and the positive electrode 20 are sequentially stacked, the positive electrode 40 including the mesh electrode current collector, and the unit stacked body u1 including the negative electrode 30, the separator 10, the positive electrode 20, the separator 10, and the negative electrode 30 that are sequentially stacked.

In this case, in the electrode assembly 100, electrodes may be stacked such that the electrodes having different polarities face each other with the separator 10 therebetween.

The negative electrode 50 including the mesh electrode current collector 51 may include the mesh electrode current collector 51 and a negative electrode active material 55 arranged on two opposite sides of the mesh electrode current collector 51. The positive electrode 20 may include a non-porous positive electrode current collector 22 and a positive electrode active material 24 arranged on two opposite sides of the non-porous positive electrode current collector 22. The negative electrode 30 may include a non-porous negative electrode current collector 32 and a negative electrode active material 34 arranged on two opposite sides of the non-porous negative electrode current collector 32.

As shown in FIG. 2, the uppermost electrode of the electrode assembly 100 may be the negative electrode 50 including the mesh electrode current collector 51. The electrode assembly 100 may have a structure in which the negative electrode 30, the separator 10, the unit stacked body u1, the separator 10, and the negative electrode 50 are sequentially stacked, the unit stacked body u1 including the positive electrode 20, the separator 10, the negative electrode 30, the separator 10, and the positive electrode 20 that are sequentially stacked, and the negative electrode 50 including the mesh electrode current collector 51.

Also, though not shown in the present specification, the electrode assembly 100 may also have a structure in which the positive electrode 20, the separator 10, the unit stacked body u1, the separator 10, and the positive electrode 40 are sequentially stacked, the unit stacked body u1 including the negative electrode 30, the separator 10, the positive electrode 20, the separator 10, and the negative electrode 30 that are sequentially stacked, and the positive electrode 40 including the mesh electrode current collector.

As shown in FIG. 3, both the uppermost electrode and the lowermost electrode of the electrode assembly 100 may be the negative electrodes 50 including the mesh electrode current collector 51. The electrode assembly 100 may have a structure in which the negative electrode 50, the separator 10, the unit stacked body u1, the separator 10, and the negative electrode 50 are sequentially stacked, the negative electrode 50 including the mesh electrode current collector 51, and the unit stacked body u1 including the positive electrode 20, the separator 10, the negative electrode 30, the separator 10, and the positive electrode 20 that are sequentially stacked.

Also, though not shown in the present specification, the electrode assembly 100 may also have a structure in which the positive electrode 40, the separator 10, the unit stacked body u1, the separator 10, and the positive electrode 40 are sequentially stacked, the unit stacked body u1 including the negative electrode 30, the separator 10, the positive electrode 20, the separator 10, and the negative electrode 30 that are sequentially stacked, and the positive electrode 40 including the mesh electrode current collector. However, it may be advantageous in aspects of manufacturing costs and stability to form the negative electrode 50 including the mesh electrode current collector 51 as the lowermost electrode and the uppermost electrode of the electrode assembly 100.

As shown in FIG. 4, the electrode assembly 100 may include the negative electrode 50 including the mesh electrode current collector 51 and the positive electrode 40 including a mesh electrode current collector 41 as the lowermost electrode and the uppermost electrode, and two unit stacked bodies u1 and u2. The electrode assembly 100 may have a structure in which the negative electrode 50, the separator 10, the unit stacked body u1, the separator 10, the negative electrode 30, a unit stacked body u2, the separator 10, and the positive electrode 40 are sequentially stacked, the negative electrode 50 including the mesh electrode current collector 51, the unit stacked body u1 including the positive electrode 20, the separator 10, the negative electrode 30, the separator 10, and the positive electrode 20 that are sequentially stacked, the unit stacked body u2 including the negative electrode 30, the separator 10, the positive electrode 20, the separator 10, and the negative electrode 30 that are sequentially stacked, and the positive electrode 40 including the mesh electrode current collector 41.

The positive electrode 40 including the mesh electrode current collector 41 may include the mesh electrode current collector 41 and a positive electrode active material 45 arranged on two opposite sides of the mesh electrode current collector 41. The negative electrode 50 including the mesh electrode current collector 51 may include the mesh electrode current collector 51 and a negative electrode active material 55 arranged on two opposite sides of the mesh electrode current collector 51.

Also, though not shown in the present specification, the electrode assembly 100 may also have a structure in which the positive electrode 40, the separator 10, the unit stacked body u1, the separator 10, the unit stacked body u2, the separator 10, and the negative electrode 50 are sequentially stacked, the positive electrode 40 including the mesh electrode current collector, the unit stacked body u1 including the negative electrode 30, the separator 10, the positive electrode 20, the separator 10, and the negative electrode 30 that are sequentially stacked, the unit stacked body u2 including the positive electrode 20, the separator 10, the negative electrode 30, the separator 10, and the positive electrode 20 that are sequentially stacked, and the negative electrode 50 including the mesh electrode current collector.

Though FIGS. 1 to 4 show the electrode assembly including only one or two unit stacked bodies u1 and u2, an electrode assembly including three or more unit stacked bodies is also possible.

As described above, when the electrodes 40 and 50 including the mesh electrode current collectors 41 and 51 are provided as the lowermost electrode and the uppermost electrode of the electrode assembly 100, not only an irreversible capacity of a battery employing this electrode assembly may be reduced but also a capacity increase and energy density improvement of the battery due to thickness reduction may be expected.

Figure 5:
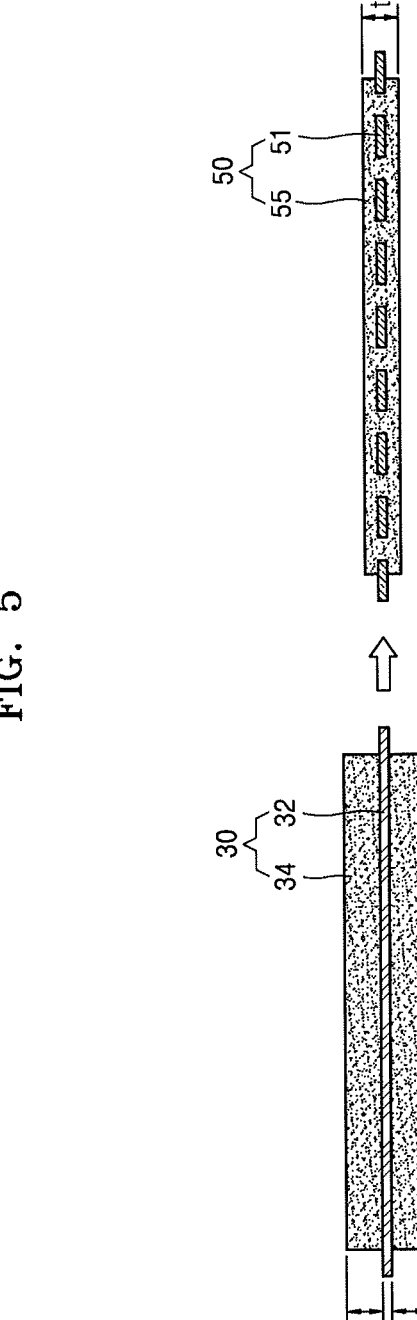
FIG. 5 is a view showing a thickness reduction effect of a negative electrode including a mesh electrode current collector compared to a negative electrode including a non-porous electrode current collector.

FIG. 5 is a view showing a thickness reduction effect of the negative electrode 50 including the mesh electrode current collector 51 compared to the negative electrode 30 including the non-porous electrode current collector 32. Referring to the drawing, compared to the negative electrode 30 in which negative electrode active materials 34 having a constant thickness t are arranged on two opposite sides of the non-porous electrode current collector 32, a thickness t' of the negative electrode 50 including the mesh electrode current collector 51 may be reduced to a level of about ½ of a thickness of the negative electrode 30. For example, when the negative electrode 30 is arranged on an outermost portion of the electrode assembly, the negative electrode 30 including the negative electrode active materials 34 arranged on two opposite sides of the non-porous electrode current collector 32, since a reaction area in which a lithium ion reaction actually occurs is limited to one side of the electrode current collector 32 that faces a positive electrode (not shown), the performance of an entire battery is not influenced even though a thickness of the negative electrode 50 including the mesh electrode current collector 51 is reduced to a half.

Though FIG. 5 shows a thickness reduction effect of the negative electrode 50 including the mesh electrode current collector 51 compared to the negative electrode 30 including the non-porous electrode current collector 32, the same thickness reduction effect is achieved in the case of the positive electrode 40 including the mesh electrode current collector 41 compared to the positive electrode 20 including the non-porous electrode current collector 22.

Figure 6:
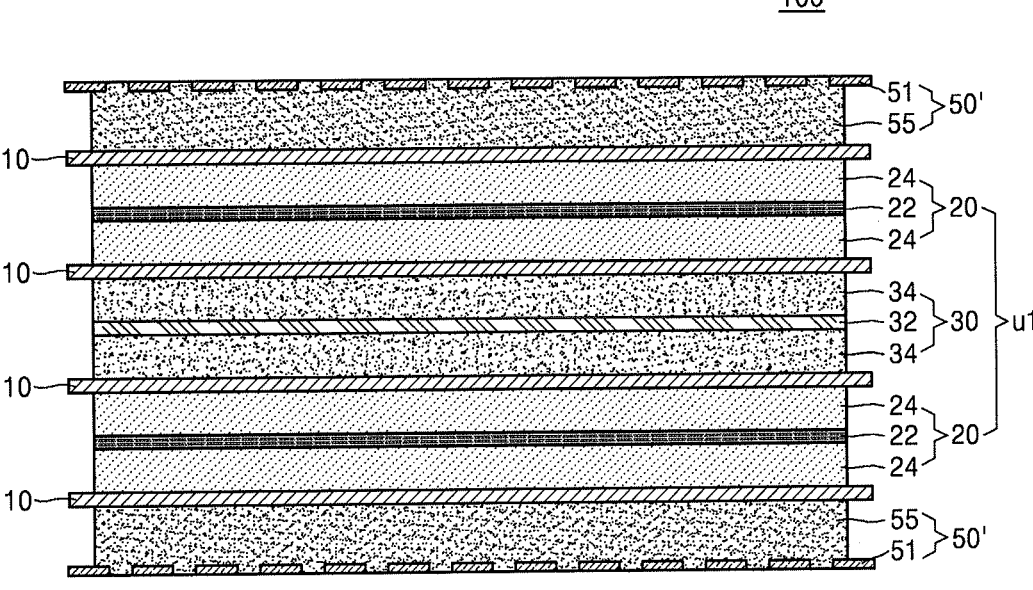
FIGS. 6 to 8 are cross-sectional views of the structures of electrode assemblies according to different embodiments.
Figure 7:

FIGS. 6 and 7 are cross-sectional views of the stacked electrode assembly 100 according to an embodiment. Referring to the drawings, both the lowermost electrode and the uppermost electrode of the electrode assembly 100 may be electrodes 50' including the mesh electrode current collector 51. The electrode assembly 100 may have a structure in which the negative electrode 50', the separator 10, the unit stacked body u1, the separator 10, and the negative electrode 50' are sequentially stacked, the negative electrode 50' including the mesh electrode current collector 51, and the unit stacked body u1 including the positive electrode 20, the separator 10, the negative electrode 30, the separator 10, and the positive electrode 20 that are sequentially stacked.

Unlike the negative electrode 50 including the mesh electrode current collector 51 shown in FIG. 3, the negative electrode 50' including the mesh electrode current collector 51 shown in FIGS. 6 and 7 includes a negative electrode active material 55 arranged on one side of the mesh electrode current collector 51. That is, the negative electrode 50 including the mesh electrode current collector 51 shown in FIG. 3 includes the negative electrode active materials 55 arranged on two opposite sides of the mesh electrode current collector 51. In contrast, the negative electrode 50' including the mesh electrode current collector 51 shown in FIGS. 6 and 7 includes the negative electrode active material 55 arranged on one side of the mesh electrode current collector 51.

More specifically, in an embodiment of FIG. 6, the negative electrode active material 55 is arranged on an inner surface of the mesh electrode current collector 51, or an inner surface of the mesh electrode current collector 51 that faces the unit stacked body u1. In an embodiment of FIG. 7, the negative electrode active material 55 is arranged on an outer surface of the mesh electrode current collector 51, or an outer surface opposite to the unit stacked body u1.

In embodiments of FIGS. 6 and 7, since the negative electrode active material 55 is open toward two opposite sides of the mesh electrode current collector 51 through openings of the mesh electrode current collector 51, the negative electrode active material 55 arranged on one of an inner surface and an outer surface of the mesh electrode current collector 51 may act in a two-side direction of the mesh electrode current collector 51. That is, the negative electrode active material 55 arranged on an outer surface of the mesh electrode current collector 51 and not directly facing the positive electrode 20 of the unit stacked body u1 may also participate in an electric chemical reaction equally to the negative electrode active material 55 arranged on an inner surface.

In the embodiment of FIG. 6, since the negative electrode active material 55 arranged on the inner surface of the mesh electrode current collector 51 does not act through the openings of the mesh electrode current collector 51 and directly faces the positive electrode of the unit stacked body u1, the embodiment of FIG. 6 may be more advantageous in increasing a battery capacity. In the embodiment of FIG. 7, the mesh electrode current collector 51 is arranged on a relatively inner side compared to the negative electrode active material 55, the mesh electrode current collector 51 may avoid a direct short-circuit with a case (not shown) and thus be more advantageous in an aspect of safety.

Though not shown in the present specification, the electrode assembly 100 may have a structure in which the positive electrode 40, the separator 10, the unit stacked body u1, the separator 10, and the positive electrode 40 are sequentially stacked, the positive electrode 40 including the mesh electrode current collector, and the unit stacked body u1 including the negative electrode 30, the separator 10, the positive electrode 20, the separator 10, and the negative electrode 30 that are sequentially stacked. In this case, the positive electrode 40 including the mesh electrode current collector may include the positive electrode active material 45 arranged on one of an inner surface facing the unit stacked body u1 and an outer surface opposite to the unit stacked body u1.

Figure 8:
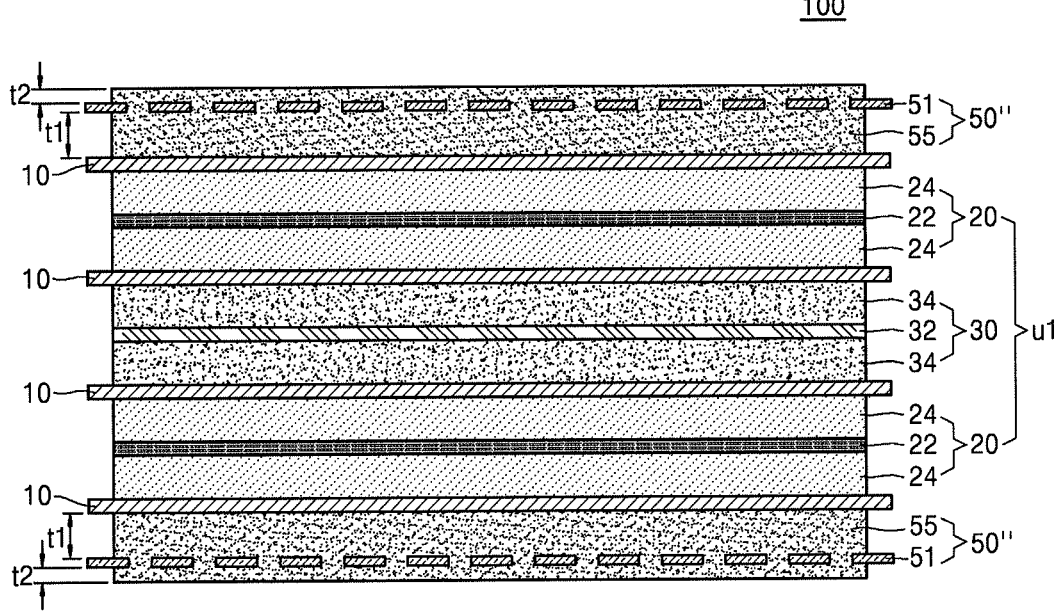

FIG. 8 is a cross-sectional view of a stacked electrode assembly according to an embodiment. Referring to the drawings, both the lowermost electrode and the uppermost electrode of the electrode assembly 100 may be a negative electrode 50" including the mesh electrode current collector 51. The electrode assembly 100 may have a structure in which the negative electrode 50", the separator 10, the unit stacked body u1, the separator 10, and the negative electrode 50" are sequentially stacked, the negative electrode 50" including the mesh electrode current collector 51, and the unit stacked body u1 including the positive electrode 20, the separator 10, the negative electrode 30, the separator 10, and the positive electrode 20 that are sequentially stacked.

Like the negative electrode 50 including the mesh electrode current collector 51 shown in FIG. 3, the negative electrode 50" including the mesh electrode current collector 51 shown in FIG. 8 includes the negative electrode active materials 55 arranged on two opposite sides of the mesh electrode current collector 51. However, in the embodiment of FIG. 8, thicknesses t1 and t2 of the negative electrode active materials 55 respectively arranged on an inner surface and an outer surface of the mesh electrode current collector 51 are different from each other. For example, the thickness t1 of the negative electrode active materials 55 arranged on the inner surface of the mesh electrode current collector 51 that faces the unit stacked body u1 may be greater than the thickness t2 of the negative electrode active material 55 arranged on the outer surface of the mesh electrode current collector 51 that is opposite to the unit stacked body u1. That is, in the embodiment of FIG. 8, the negative electrode 50" including the mesh electrode current collector 51 may be formed in an asymmetric structure including the negative electrode active materials 55 respectively arranged on the inner surface and the outer surface and having the different thicknesses t1 and t2.

Since the negative electrode active materials 55 are formed on two opposite sides of the mesh electrode current collector 51, adhesive force between the negative electrode active materials 55 and the mesh electrode current collector 51 may be improved, and since a relatively thick negative electrode active material 55 is arranged on the inner surface of the mesh electrode current collector 51 that directly faces the positive electrode 20 of the unit stacked body u1, a battery performance may be improved.

In the embodiment of FIG. 8, in forming the negative electrode 50" including the mesh electrode current collector 51, the negative electrode active material 55 may be allowed to penetrate through the openings of the mesh electrode current collector 51 and permeate to the outer surface of the mesh electrode current collector 51 by applying a predetermined pressure while coating the negative electrode active material 55 on one of surfaces of the mesh electrode current collector 51, for example, the inner surface. Alternatively, the negative electrode active materials 55 having the different thicknesses t1 and t2 and formed by screen printing may be press-bonded on two opposite sides of the mesh electrode current collector 51.

Though FIG. 8 shows only the negative electrode 50" including the mesh electrode current collector 51, the above-described technical characteristics are equally applicable to the positive electrode 40 including the mesh electrode current collector 41.

Figure 9:
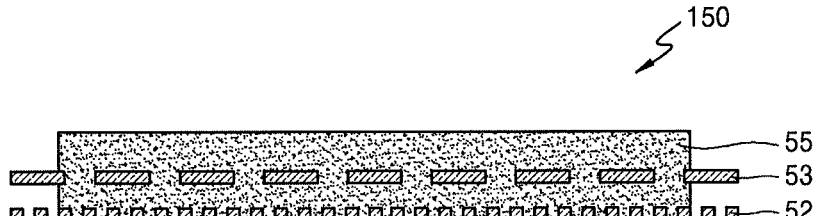
FIGS. 9 to 11 are cross-sectional views of a negative electrode including a mesh electrode current collector that is applicable to an electrode assembly according to an embodiment.
Figure 10:
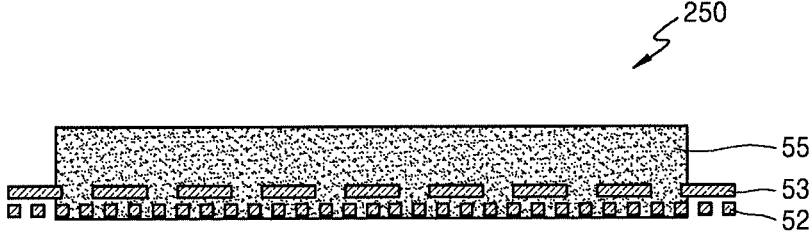
Figure 11:
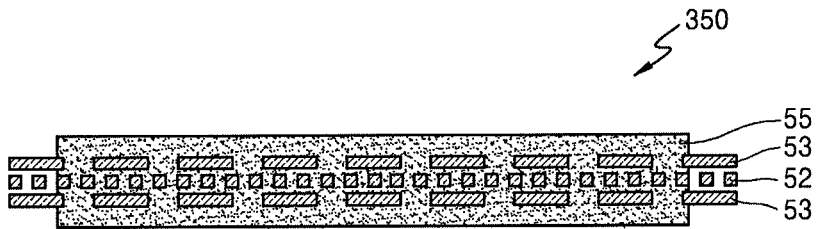

FIGS. 9 to 11 are cross-sectional views of negative electrodes 150, 250, and 350 each including mesh electrode current collectors 52 and 53 applicable to a stacked electrode assembly according to an embodiment.

Referring to the drawings, the negative electrodes 150, 250, and 350 each including the mesh electrode current collectors 52 and 53 may include two or more mesh electrode current collectors 52 and 53 that are apart from each other. For example, the negative electrodes 150, 250, and 350 each including the mesh electrode current collectors 52 and 53 may include two or more mesh electrode current collectors 52 and 53 that are apart from each other in a thickness direction of the negative electrodes 150, 250, and 350 and are parallel to each other. Since different two mesh electrode current collectors 52 and 53 are arranged inside one negative electrode 150 (250, 350), entire electrical conductivity of the negative electrode 150 (250, 350) may be improved, and the negative electrode active material 55 may be more stably fixed. The improvement of the electrical conductivity may lead to the improvement of power and capacity. At least two different mesh electrode current collectors 52 and 53 among different mesh electrode current collectors 52 and 53 arranged inside the one negative electrode 150 (250, 350) may be formed to include openings at different locations or have different aperture ratios. For example, the different mesh electrode current collectors 52 and 53 arranged inside the one negative electrode 150 (250, 350) may have openings at different locations or have different aperture ratios such that electrical conductivities supplement or make up for each other inside the one negative electrode 150 (250, 350). For example, the mesh electrode current collector 52 having a relatively low aperture ratio may improve adhesive force with the electrode active material 55. Since the mesh electrode current collector 53 having a relatively high aperture ratio receives the electrode active material 55 inside a plurality of openings, an influence on a loading amount of the electrode active material 55 corresponding to the inclusion of two or more mesh electrode current collectors 52 and 53 may be reduced and electrical conductivity may be supplemented. Also, in the case of the mesh electrode current collector 52 having a relatively low aperture ratio, mesh is dense and thus the electrode active material 55 does not fill the mesh properly. In the case of the mesh electrode current collector 53 having a relatively high aperture ratio, the electrode active material 55 is not fixed properly and may easily fall out through the opening. Therefore, characteristics of respective mesh electrode current collectors 52 and 53 may be supplemented by combining the mesh electrode current collectors 52 and 53 having different aperture ratios.

In the embodiments of FIGS. 9 and 10, one negative electrode 150 (250) may include two different mesh electrode current collectors 52 and 53. In the embodiment of FIGS. 11, one negative electrode 350 may include three different mesh electrode current collectors 52 and 53. In the embodiment of FIG. 11, two mesh electrode current collectors 52 and 53 among the three mesh electrode current collectors 52 and 53 provided to one negative electrode 350 may have openings at different locations or have different aperture ratios. For example, as shown in FIG. 11, since the mesh electrode current collectors 53 having a relatively high aperture ratio are arranged on two opposite sides of the mesh electrode current collector 52 having a relatively low aperture ratio, the entire negative electrode 350 may have a symmetric structure and have a symmetric electrical conductivity in a thickness direction of the negative electrode 350.

Though FIGS. 9 to 11 show only the negative electrode 50 including two different mesh electrode current collectors 52 and 53, the above-described technical characteristics are equally applicable to the positive electrode 40 including two different mesh electrode current collectors.

Figure 12:
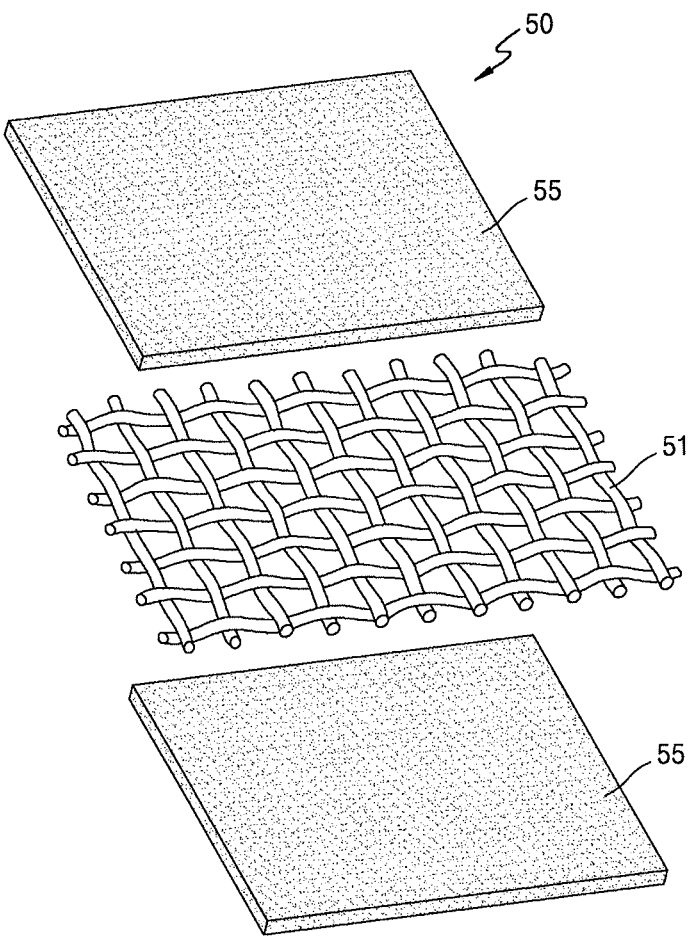
FIG. 12 is a view for explaining forming of a negative electrode including a mesh electrode current collector.

FIG. 12 is a view for explaining forming of a negative electrode including a mesh electrode current collector. Referring to the drawing, the mesh electrode current collector 51 may have a metal mesh shape in which a plurality of openings are two-dimensionally arranged. The negative electrode 50 may be formed by press-bonding two layers of the negative electrode active materials 55 on two opposite surfaces of the mesh electrode current collector 51 in a direction in which the two layers of the negative electrode active materials 55 face each other, the two layers of the negative electrode active materials 55 being formed by screen printing. Here, the mesh electrode current collector 51 may include a plurality of metal wires extending in two different directions, the metal wires being weaved. That is, the mesh electrode current collector 51 has a generally flat plate-shaped structure but is not formed in a completely flat shape and may have a shape weaved in a fabric form. The mesh electrode current collector 51 formed in this manner may have a plurality of curves in two opposite surface directions and increase adhesive force with the electrode active materials 55 arranged on two opposite surfaces of the mesh electrode current collector 51.

For another method of forming the negative electrode 50 including the mesh electrode current collector 51, there may be a method of immersing the mesh electrode current collector 51 in a bathtub (not shown) containing slurry for forming the negative electrode active materials 55, and collectively forming the negative electrode active materials 55 on two opposite surfaces of the mesh electrode current collector 51.

Also, a coating method may be applied, the coating method including coating the negative electrode active material 55 on one side of the mesh electrode current collector 51 so as to form the negative electrode 50 in which the negative electrode active material 55 is formed on one side of the mesh electrode current collector 51.

Though FIG. 12 shows only the forming of the negative electrode 50 including the mesh electrode current collector 51, the above-described technical characteristics are equally applicable to the positive electrode 40 including the mesh electrode current collector 41.

FIGS. 13A to 13D are photos of various shapes of mesh electrode current collectors.

Figure 13A:
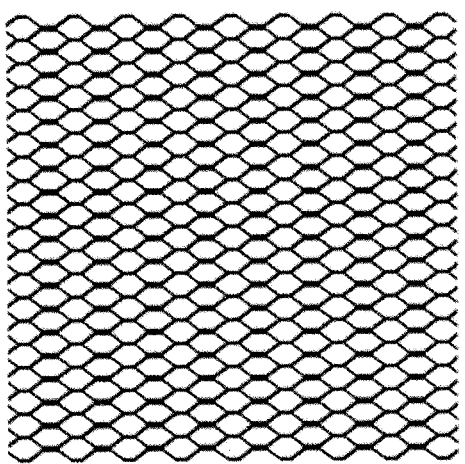
FIGS. 13A to 13D are photos of various shapes of mesh electrode current collectors.
Figure 13B:
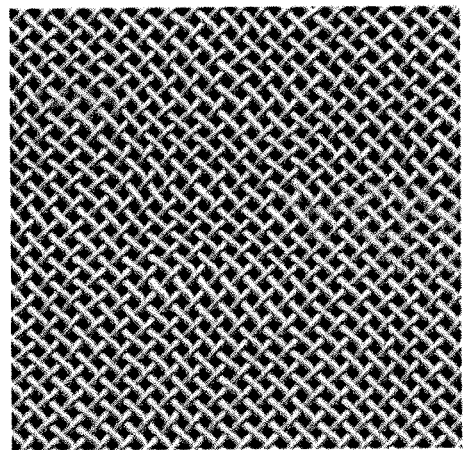

The mesh electrode current collector according to an embodiment may have a shape weaved in a metal mesh structure as in FIG. 13A, or have a shape weaved in a fabric form as in FIG. 13B. Also, the mesh electrode current collector according to an embodiment may have a shape in which a plurality of openings are punched in a single thin-plate sheet as in FIG. 13C. Also, the mesh electrode current collector according to an embodiment may have openings of irregular shapes as in FIG. 13D. For example, the mesh electrode current collector having openings of irregular shapes may be prepared in a non-woven fabric shape.

Figure 13C:
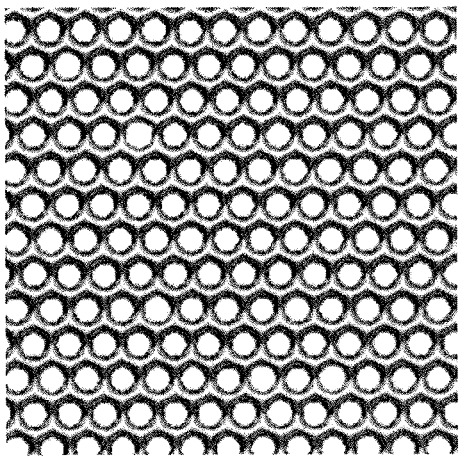
Figure 13D:
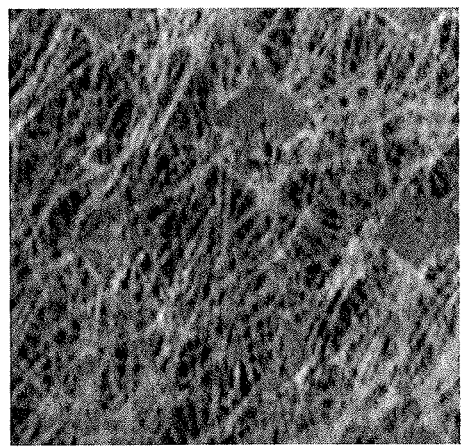

The mesh electrode current collector according to an embodiment may include various shapes of regular openings as shown in FIGS. 13A to 13C, or include openings of irregular shapes as shown in FIG. 13D.

The mesh electrode current collectors 41 and 51 may have a shape in which a plurality of openings are two-dimensionally arranged in a base material having a sheet shape on the whole. For example, the mesh electrode current collectors 41 and 51 may have a metal mesh shape.

For example, the mesh electrode current collectors 41 and 51 may include at least one of Al, Ti, V, CR, Mn, Fe, Co, Ni, Cu, Zn, Zr, Nb, Ag, W, Pt, SUS, and a combination thereof.

In the case where an electrode including the mesh electrode current collector 51 is the negative electrode 50, the mesh electrode current collector 51 may include a Cu metal mesh. In the case where an electrode including the mesh electrode current collector 41 is the positive electrode 40, the mesh electrode current collector 41 may include an Al metal mesh. For example, in the case where an electrode including the mesh electrode current collector 51 is the negative electrode 50, the mesh electrode current collector 51 may be a Cu metal mesh. In the case where an electrode including the mesh electrode current collector 41 is the positive electrode 40, the mesh electrode current collector 41 may be an Al metal mesh.

For example, a thickness of the mesh electrode current collectors 41 and 51 may be about 10 μm to about 500 μm. Specifically, for example, a thickness of the mesh electrode current collectors 41 and 51 may be about 50 μm to about 500 μm. Specifically, for example, a thickness of the mesh electrode current collectors 41 and 51 may be about 50 μm to about 200 μm. When the electrodes 40 and 50 including the mesh electrode current collectors 41 and 51 having the above thickness range are employed in a lowermost portion and/or an uppermost portion of a battery, an irreversible capacity of the battery may be reduced.

The mesh electrode current collectors 41 and 51 may include an opening in an appropriate range so as to reduce an irreversible capacity and implement a desired capacity of the battery.

Figure 14:
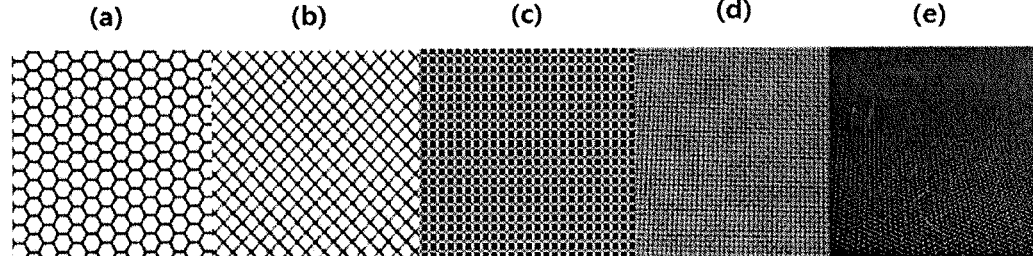
FIG. 14 is a photo of a mesh electrode current collector having a different number of openings or different aperture ratios.

FIG. 14 is a photo of a mesh electrode current collector having a different number of openings or different aperture ratios. A size of an opening, the number of openings, and an aperture ratio in each of mesh electrode current collectors shown in FIGS. 14A to 14F are provided in Table 1.

TABLE 1

|     | Size of opening (inch) | Number of openings (ppi) | Aperture ratio (%) |
| --- | --- | --- | --- |
| (a) | $\frac{1}{32}$ | 20 | 52 |
| (b) | $\frac{1}{50}$ | 30 | 41 |
| (c) | $\frac{1}{64}$ | 40 | 36 |
| (d) | 0.009 | 60 | 31 |
| (e) | 0.007 | 80 | 31 |
| (f) | 0.005 | 100 | 30 |

In Table 1, a size (inch) of an opening denotes a diameter of the opening, and the number of openings denotes the number of openings per inch (ppi, pore per inch). In FIG. 14, it is shown that the number of openings per inch (ppi) gradually increases and an aperture ratio decreases from (a) on the left to (f) on the right.

An increase in the number of openings per inch (ppi) in the mesh electrode current collector means that openings having a small size are densely arranged. This means that an aperture ratio is reduced as much as that.

The number of openings or an aperture ratio of the mesh electrode current collectors 41 and 51 may be designed in different ranges for the electrodes 40 and 50 in which an electrode active material is arranged on one side of the relevant mesh electrode current collectors 41 and 51, and the electrodes 40 and 50 in which electrode active materials are arranged on two opposite sides of the relevant mesh electrode current collectors 41 and 51.

The electrode including the electrode active materials on two opposite sides of the mesh electrode current collectors 41 and 51 may maintain adhesive force with the electrode active material even though the electrode includes the mesh electrode current collectors 41 and 51 having a relatively high aperture ratio (a relatively small number of openings). Also, within a limit in which the electrode active material is properly fixed, when the mesh electrode current collectors 41 and 51 have a high aperture ratio (a relatively small number of openings), a loading amount of the electrode active material that may penetrate into the openings may be increased, and the electrode active materials formed on two opposite surfaces of the mesh electrode current collectors 41 and 51 may be closely connected to each other through the openings of the mesh electrode current collectors 41 and 51 that are sufficiently formed, and thus may facilitate an electrical chemical reaction. More specifically, as in the embodiments of FIGS. 3 and 4, when the electrodes 40 and 50 including the mesh electrode current collectors 41 and 51 include the electrode active materials 45 and 55 arranged on two opposite sides of the mesh electrode current collectors 41 and 51, the number of openings (ppi) of the mesh electrode current collectors 41 and 51 may be 30 or less per inch, or an aperture ratio of the mesh electrode current collectors 41 and 51 may be 40% or more.

In the case of the electrodes 40 and 50 including the electrode active material on one side of the mesh electrode current collectors 41 and 51, when the electrodes 40 and 50 include the mesh electrode current collectors 41 and 51 having a relatively small aperture ratio (a relatively large number of openings), the electrodes 40 and 50 are advantageous in maintaining excellent adhesive force with the electrode active material. More specifically, as in the embodiments of FIGS. 6 and 7, when the electrode (ex. the negative electrode 50') including the mesh electrode current collector 51 includes the electrode active material (ex. a negative active material 55) arranged on one side of the mesh electrode current collectors 41 and 51, the number of openings (ppi) of the mesh electrode current collector 51 may be 30 or more per inch, or an aperture ratio of the mesh electrode current collector 51 may be 40% or less.

In other words, since the mesh electrode current collectors 41 and 51 in which the number of openings (ppi) is 30 or more per inch, or an aperture ratio is 40% or less (the mesh electrode current collector having a small aperture ratio) may maintain excellent adhesive force with the electrode active material, both the electrodes 40 and 50 may be provided, the electrodes 40 and 50 including the electrode active materials arranged on two opposite sides or one side of the mesh electrode current collectors 41 and 51. In contrast, in the case of the mesh electrode current collectors 41 and 51 in which the number of openings (ppi) is 30 or less per inch, or an aperture ratio is 40% or more (the mesh electrode current collector having a high aperture ratio), it may be advantageous to provide the electrodes 40 and 50 in which the electrode active materials are arranged on two opposite surfaces of the mesh electrode current collectors 41 and 51 in maintaining excellent adhesive force with the electrode active material. When an electrode in which the electrode active material is arranged on one side of the mesh electrode current collectors 41 and 51 is provided, the mesh electrode current collectors 41 and 51 having a relatively high aperture ratio, adhesive force with the electrode active material may be reduced.

As shown in FIGS. 9 to 11, since the electrode (ex. the negative electrodes 150, 250, and 350) including two or more different mesh electrode current collectors 52 and 53 may properly fix the electrode active material by using the two different mesh electrode current collectors 52 and 53, even the mesh electrode current collectors 52 and 53 including a relatively small number of openings or having a relatively high aperture ratio (the mesh electrode current collector having a high aperture ratio) may constitute the electrode in which the electrode active material is arranged on one side.

Figure 15:
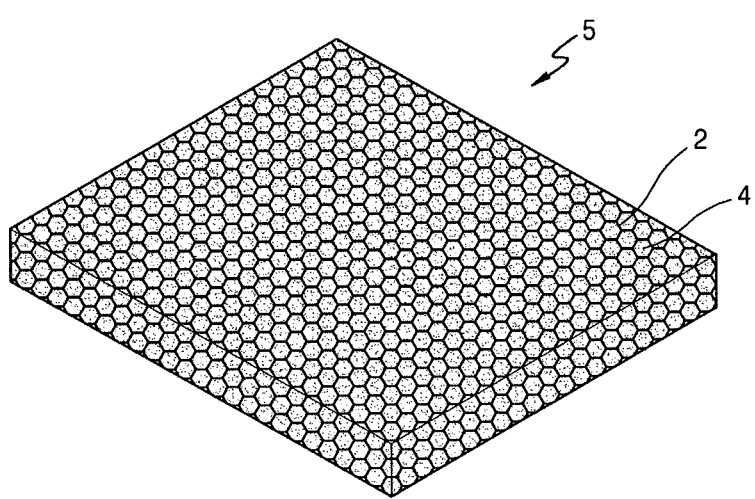
FIG. 15 is a view of an electrode current collector having a metal foam-shaped three-dimensional opening according to a comparative example.

FIG. 15 is a view of an electrode 5 including an electrode current collector 2 and an electrode active material 4 according to a comparative example, the electrode current collector 2 including a three-dimensional pore having a metal foam shape, and the electrode active material 4 penetrating into the pore of the electrode current collector 2. In the electrode 5 having this shape, since an entire thickness of the electrode 5 is limited by the electrode current collector 2 having a metal foam shape, the electrode 5 has a relatively thick thickness compared to the electrodes 40 and 50 including the mesh electrode current collectors 41 and 51 according to an embodiment. Also, a loading amount of the electrode active material 4 is limited by a volume corresponding to a fine pore of the electrode current collector 2 having a metal foam shape. Since a volume is increased due to the electrode current collector 2 having a relatively thick metal foam shape but a loading amount of the electrode active material 4 is limited by the volume of the fine pore, energy density per same volume is limited and the energy density is relatively reduced.

Hereinafter, a method of manufacturing the lithium battery is described.

The positive electrode 40 including the mesh electrode current collector 41 may be manufactured as below.

First, the mesh electrode current collector 41 is prepared. Next, a positive electrode active material composite may be manufactured by mixing a positive electrode active material as an electrode active material, a binder, and a selectively conductive material in solvent. The positive electrode 40 including the mesh electrode current collector 41 may be manufactured by forming the above-manufactured positive electrode active material composite in a layered structure through screen printing and bonding the positive electrode active material composite on two opposite surfaces of the mesh electrode current collector through pressing, or immersing the mesh electrode current collector in a bathtub containing the positive electrode active material composite, or coating the positive electrode active material composite, and then drying the mesh electrode current collector.

For positive electrode active material used for the positive electrode active material composite, all of materials generally used in the art may be used. For example, a compound expressed in one of chemical formulas may be used, the chemical formulas including $Li_aA_{1-b}B_bD_2$ (where, $0.90 \le a \le 1$, and $0 \le b \le 0.5$); $Li_aE_{1-b}B_bO_{2-c}D_c$ (where, $0.90 \le a \le 1$, $0 \le b \le 0.5$, $0 \le c \le 0.05$); $LiE_{2-b}B_bO_{4-c}D_c$ (where, $0 \le b \le 0.5$, $0 \le c \le 0.05$); $Li_aNi_{1-b-c}Co_bB_cD_\alpha$ (where, $0.90 \le a \le 1$, $0 \le b \le 0.5$, $0 \le c \le 0.05$, $0 < \alpha \le 2$); $Li_aNi_{1-b-c}Co_bB_cO_{2-\alpha}F_\alpha$ (where, $0.90 \le a \le 1$, $0 \le b \le 0.5$, $0 \le c \le 0.05$, $0 < \alpha < 2$); $Li_aNi_{1-b-c}Co_bB_cO_{2-\alpha}F_2$ (where, $0.90 \le a \le 1$, $0 \le b \le 0.5$, $0 \le c \le 0.05$, $0 < \alpha < 2$); $Li_aNi_{1-b-c}Mn_bB_cD_\alpha$ (where, $0.90 \le a \le 1$, $0 \le b \le 0.5$, $0 \le c \le 0.05$, $0 < \alpha \le 2$); $Li_aNi_{1-b-c}Mn_bB_cO_{2-\alpha}F_\alpha$ (where, $0.90 \le a \le 1$, $0 \le b \le 0.5$, $0 \le c \le 0.05$, $0 < \alpha \le 2$); $Li_aNi_{1-b-c}Mn_bB_cO_{2-\alpha}F_2$ (where, $0.90 \le a \le 1$, $0 \le b \le 0.5$, $0 \le c \le 0.05$, $0 < \alpha < 2$); $Li_aNi_bE_cG_dO_2$ (where, $0.90 \le a \le 1$, $0 \le b \le 0.9$, $0 \le c \le 0.5$, $0.001 \le d \le 0.1$); $Li_aNi_bCo_cMn_dG_eO_2$ (where, $0.90 \le a \le 1$, $0 \le b \le 0.9$, $0 \le c \le 0.5$, $0 \le d \le 0.5$, $0.001 \le e \le 0.1$); $Li_aNiG_bO_2$ (where, $0.90 \le a \le 1$, $0.001 \le b \le 0.1$); $Li_aCoG_bO_2$ (where, $0.90 \le a \le 1$, $0.001 \le b \le 0.1$); $Li_aMnG_bO_2$ (where, $0.90 \le a \le 1$, $0.001 \le b \le 0.1$); $Li_aMn_2G_bO_4$ (where, $0.90 \le a \le 1$, $0.001 \le b \le 0.1$); $QO_2$; $QS_2$; $LiQS_2$; $V_2O_5$; $LiV_2O_5$; $LiIO_2$; $LiNiVO_4$; $Li_{(3-f)}J_2(PO_4)_3$ $(0 \le f \le 2)$; $Li_{(3-f)}Fe_2(PO_4)_3$ $(0 \le f \le 2)$; $LiFePO_4$.

In the above chemical formulas, A is Ni, Co, Mn, or a combination thereof; B is Al, Ni, Co, Mn, Cr, Fe, Mg, Sr, V, a rare-earth element, or a combination thereof; D is O, F, S, P, or a combination thereof; E is Co, Mn, or a combination thereof; F is F, S, P, or a combination thereof; G is Al, Cr, Mn, Fe, Mg, La, Ce, Sr, V, or a combination thereof; Q is Ti, Mo, Mn, or a combination thereof; I is Cr, V, Fe, Sc, Y, or a combination thereof; and J is V, Cr, Mn, Co, Ni, Cu, or a combination thereof.

For example, $LiCoO_2$, $LiMn_xO_{2x}$ (x=1, 2), $LiNi_{1-x}Mn_xO_{2x}$ $(0 < x < 1)$, $LiNi_{1-x-y}Co_xMn_yO_2$ $(0 > x > 0.5, 0 \le y \le 0.5)$, $FePO_4$.

A binder used for the positive electrode active material composite is a component assisting coupling of the positive electrode active material and a conductive material and coupling of the positive electrode active material and a current collector. The binder is added as much as 1 to 50 weight portion based on 100 weight portion of the positive electrode active material. For example, the binder may be added in the range of 1 to 30 weight portion, 1 to 20 weight portion, or 1 to 15 weight portion based on 100 weight portion of the positive electrode active material. The binder may be one of polyvinylidene fluoride (PVdF), polyvinylidene chloride, polybenzimidazole, polyimide, polyvinyl acetate, polyacrylonitrile, polyvinyl alcohol, carboxymethyl cellulose (CMC), starch, hydroxypropylcellulose, regenerated cellulose, polyvinyl pyrrolidone, tetrafluoroethylene, polyethylene, polypropylene, polystyrene, poly(methyl methacrylate), polyaniline, acrylonitrile-butadiene-styrene, a phenolic resin, an epoxy resin, polyethylene terephthalate, polytetrafluoroethylene, polyphenylen sulfide, polyamide imide, polyether imide, polyethylene sulfone, polyamide, polyacetal, polyphehyleneoxide, polybutylene terephthalate, ethylene propylene diene monomer (EPDM), sulfonated EPDM, styrene-butadiene rubber (SBR), fluoro rubber, and a combination thereof.

For the conductive material, any material that is generally used for a lithium battery may be used. Examples of the conductive material include a conductive material including: a carbon-based material including carbon black, acetylene black, ketjenblack, a carbon fiber; a metal-based material including metal powder or metal fiber including Cu, Ni, Al, and Ag; and a conductive polymer including polyphenylene derivatives or a mixture thereof. Content of a conductive material may be appropriately adjusted and used. For example, a weight ratio of the positive electrode active material and the conductive material may be in the range of 99:1 to 90:10.

For the solvent, N-methyl-pyrrolidone (NMP), acetone, water, etc. may be used. For the content of the solvent, 1 to 40 weight portion may be used based on 100 weight portion of the positive electrode active material. When the content of the solvent is in the above range, an operation of forming the active material is easy.

In the case of the negative electrode 50 including the mesh electrode current collector 51, the negative electrode 50 may be manufactured by the same method as a method of manufacturing the positive electrode 40 including the mesh electrode current collector 41 except that a negative electrode active material is used as an electrode active material. Also, the same binder, the same conductive material, and the same solvent as those of the positive electrode may be used for the negative electrode active material composite.

For the negative electrode active material, all of materials that are generally used in the art may be used. For example, the negative electrode active material may include at least one of a lithium metal, a metal that may be alloyed with lithium, a transition metal oxide, a non-transition metal oxide, and a carbon material.

For example, the metal that may be alloyed with lithium may include Si, Sn, Al, Ge, Pb, Bi, Sb, an Si—Y alloy (where Y is an alkali metal, an alkaline earth metal, a Group 13 element, a Group 14 element, a transition metal, a rare-earth element or a combined element thereof, Si not being included), an Sn—Y alloy (where Y is an alkali metal, an alkaline earth metal, a Group 13 element, a Group 14 element, a transition metal, a rare-earth element or a combined element thereof, Sn not being included), etc. The element Y may include Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, or a combination thereof.

For example, the transition metal oxide may include a lithium titanium oxide, a vanadium oxide, and a lithium vanadium oxide.

For example, the non-transition metal oxide may include $SnO_2$, $SiO_x$ ($0<x<2$).

The carbon material may include crystalline carbon, amorphous carbon or a mixture thereof. Examples of the crystalline carbon may include graphite such as natural graphite having an irregular shape, a plate shape, a flake shape, a spherical shape, or a fiber shape, or artificial graphite. Examples of the amorphous carbon may include soft carbon or hard carbon, mesophase pitch carbide, and calcinationed cork.

Next, the positive electrode 20 may be manufactured by a method of forming the above-manufactured positive electrode active material composite in a predetermined shape or coating the positive electrode active material composite on the non-porous positive electrode current collector 22, thereby forming the positive electrode active material 24 on at least one side of the current collector. Also, the negative electrode 30 may be manufactured by a method of forming the above-manufactured negative electrode active material composite in a predetermined shape or coating the negative electrode active material on the non-porous negative electrode current collector 32, thereby forming the negative electrode active material 34 on at least one side of the current collector.

The non-porous positive electrode and negative electrode current collectors 22 and 32 are not particularly limited as long as they have high conductivity while not causing a chemical change to a relevant battery independently. For example, the non-porous positive electrode and negative electrode current collectors 22 and 32 may include at least one of Al, Cu, Ni, Ti, and stainless steel. A base material may include a material formed by performing surface-processing on a surface of Al, Cu, Ni, stainless steel through electric plating or ion-deposition by using coating components such as Ni, Cu, Al, Ti, Au, Ag, Pt, and Pd, or a material formed by coating the surface of the main material through methods such as dip or pressing by using nano particles of these coating components. Also, the current collector may include the above-described conductive material covering the base including a non-conductive material. The current collector may include a fine uneven structure on a surface thereof. The uneven structure may increase adhesive force with an active material to be coated on a base material. The current collector may generally have a thickness from about 10 μm to about 30 μm.

Next, according to the above-described embodiment, a stacked electrode assembly may be manufactured by sequentially stacking a lowermost electrode, a separator, one or more unit stacked bodies, a separator, and an uppermost electrode.

In this case, a positive electrode active material used for each of positive electrodes may be the same or different from each other. Also, a negative electrode active material used for each of negative electrodes may be the same or different from each other.

For the separators, all of separators that are generally used for a lithium battery may be used. Particularly, a separator having a low resistance against ion transfer of electrolyte and having an excellent electrolyte-containing ability is suitable. For example, the separator may include a material including a glass fiber, polyester, Teflon, polyethylene, polypropylene, polytetrafluoroethylene, and a combination thereof. The separator may be a non-woven fabric or a woven form. An opening of the separator may have a diameter of about 0.01 μm to about 10 μm. A thickness of the separator may be about 5 μm to about 300 μm. In the above range, capacity reduction of a battery per unit volume may be minimized and safety against inner short-circuit may be secured. For example, a thickness of the separator may be about 8 μm to about 30 μm.

After that, a lithium battery may be manufactured by inserting the stacked electrode assembly in a case having a shape such as a square shape and a cylindrical shape, and then injecting electrolyte.

In this case, the electrolyte may include non-water-based electrolyte and lithium salt. For the non-water-based electrolyte, non-water electrolyte, organic solid electrolyte, etc. may be used.

The non-water electrolyte may include, for example, a deprotonated organic solvent including N-methyl-pyrrolidone, propylene carbonate (PC), ethylene carbonate (EC), butylenes carbonate, dimethyl Carbonate (DMC), diethyl carbonate (DEC), ethyl methyl carbonate (EMC), gamma-butyrolactone (GBL), 1,2-dimethoxyethane) (DME), tetrahydrofuran (THF), 2-methyl tetrahydrofuran, dimethylsulfoxide (DMSO), 1,3-dioxolane, formamide, dimethylformamide, acetonitrile, nitromethane, methyl formate, methyl acetate, phosphate trimester, tri methoxy methane, dioxolane derivatives, sulfolane, methyl sulfolane, 1,3-dimethyl-2-imidazolidinone, propylene carbonate derivatives, ether, methyl propionate, propionic acid, and ethyl propionate.

Examples of the organic solid electrolyte may include, for example, polyethylene derivatives, polyethylene oxide derivatives, polypropylene oxide derivatives, phosphorus ester polymer, polylysine, polyester sulfide, polyvinyl alcohol, polyvinylidene fluoride, or a polymer including an ionic dissociation group.

For the lithium salt, all of materials that are generally used for a lithium battery may be used. For a material that may be well dissolved in the non-water-based electrolyte, at least one of, for example, $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $C_4F_9SO_3Li$, $(CF_3SO_2)_2NLi$, lithium chloro borate, lower aliphatic carbonic acid lithium, 4 phenyl boric acid lithium, or imide may be used.

Also, an SEI layer is formed on a surface of a negative electrode in the electrolyte. To maintain the SEI layer, the electrolyte may include vinylene carbonate (VC), and catechol carbonate (CC). Selectively, to prevent overcharge, the electrolyte may include a redox-shuttle type additive including n-butyl ferrocene, and benzene replaced with halogen.

Selectively, the electrolyte may include an additive for forming a film including cyclohexylbenzene and biphenyl. Selectively, to improve a conduction characteristic, the electrolyte may include a cation receptor such as crown ether-based compound, and anion receptor such as boron-based compound. Selectively, the electrolyte may additionally include, as an incombustible material, phosphate-based compound such as trimethyl phosphate, tris (2,2,2-trifluoroethyl) phosphate (TFP), and hexamethoxy cyclotriphosphazene (HMTP).

When needed, to further improve safety of a lithium battery by assisting the forming of a stable SEI layer or a film on a surface of an electrode, the electrolyte may further include an additive including tris (trimethylsilyl) phosphate (TMSPa), lithium difluorooxalateborate (LiFOB), propanesultone (PS), succinonitrile (SN), $LiBF_4$, for example, silane compound having a functional group that may form a siloxane coupling such as acryl, amino, epoxy, methoxy, vinyl, and silazane compound such as hexamethyldisilazane. Specifically, the electrolyte may further include, for example, propanesultone (PS), succinonitrile (SN), and $LiBF_4$.

For example, the electrolyte may be manufactured by adding a lithium salt such as $LiPF_6$, $LiClO_4$, $LiBF_4$, and $LiN(SO_2CF_3)_2$ to a mixed solvent of a circular carbonate of EC or PC, which is a high dielectric solvent, and a linear carbonate of DEC, DMC, or EMC which is a low-viscosity solvent.

Since the lithium battery has an excellent life characteristic and an excellent high efficiency characteristic, the lithium battery may be used for an electric vehicle (EV). For example, the lithium battery may be used for hybrid vehicles such as plug-in hybrid electric vehicles (PHEV). The lithium battery may be also used for electric bicycles, electrically-drive tools, and other all purposes requiring high power, a high voltage, and high temperature driving.

The lithium battery may include a lithium secondary battery.

Example embodiments are described in more detail through an embodiment and a comparative example below. However, since the embodiment is provided to describe a technical spirit as an example, the scope of the present disclosure is not limited thereto.

Embodiment 1

(Manufacturing of a Negative Electrode Including a Mesh Electrode Current Collector)

A Cu metal mesh is prepared as a mesh electrode current collector. Also, a negative electrode active material composite is manufactured by mixing negative electrode active material graphite 98 weight % (manufactured by Shanghai Shanshan Co.) and a binder SBR 2 weight % (manufactured by Zeon Co.) in solvent of N-methyl pyrrolidone. The negative electrode is manufactured by coating the manufactured negative electrode active material composite on two opposite surfaces of the Cu metal mesh and drying the same.

(Manufacturing of a Positive Electrode)

A positive electrode active material composite is manufactured by mixing a positive electrode active material $LiCoO_2$ 97.5 weight % (manufactured by Umicore Co.), a conductive material carbon black 1 weight % (product name ECP, manufactured by Lion Co.), and a binder PVdF 1.5 weight % (product name Solef, manufactured by Sovay Co.) in solvent of N-methyl pyrrolidone. The positive electrode having a thickness of about 120 μm is manufactured by coating the above-manufactured active material composite on two opposite surfaces of an aluminum foil current collector having a thickness of 15 μm, drying and pressing the same.

(Manufacturing of a Negative Electrode)

A negative electrode active material composite is manufactured by mixing negative electrode active material graphite 98 weight % (manufactured by Shanghai Shanshan Co.) and a binder SBR 2 weight % (manufactured by Zeon Co.) in solvent of N-methyl pyrrolidone. The negative electrode having a thickness of about 145 μm is manufactured by coating the above-manufactured active material composite on two opposite surfaces of a Cu foil current collector having a thickness of about 10 μm, drying and pressing the same.

(Manufacturing of an Electrode Assembly)

A separator including a polyethylene (PE) film (manufactured by Toray Co.) is prepared, and as shown in FIG. 3, the electrode assembly is manufactured by sequentially stacking the negative electrode including the above-manufactured mesh electrode current collector, a separator, the manufactured positive electrode, a separator, the manufactured negative electrode, a separator, the manufactured positive electrode, a separator, and the negative electrode including the manufactured mesh electrode current collector.

(Manufacturing of a Lithium Secondary Battery)

A pouch-type lithium secondary battery is manufactured by inserting the electrode assembly in a pouch-type case, and then injecting electrolyte including lithium salt of 1.3 M $LiPF_6$ to solvent in which ethylene carbonate (EC), ethyl methyl carbonate (EMC), and dimethyl carbonate (DMC) are mixed at a volume ratio of 1:1:1.

Embodiment 2

(Manufacturing of a Negative Electrode Including Two Different Mesh Electrode Current Collectors)

A Cu metal mesh is prepared as a mesh electrode current collector. In this case, for the mesh electrode current collector, two different mesh electrode current collectors are prepared, the two different mesh electrode current collectors having openings at different locations or having different aperture ratios. As shown in FIG. 9, a mesh electrode current collector 52 having a relatively low aperture ratio in which the number of openings per inch (ppi) is 100, and a mesh electrode current collector 53 having a relatively high aperture ratio in which the number of openings per inch (ppi) is 40 are prepared.

Also, a negative electrode active material composite is manufactured by mixing negative electrode active material graphite 98 weight % (manufactured by Shanghai Shanshan Co.) and a binder SBR 2 weight % (manufactured by Zeon Co.) in solvent of N-methyl pyrrolidone. The negative electrode is manufactured by coating the manufactured negative electrode active material composite on the Cu metal mesh and drying the same. In this case, referring to FIG. 9, a negative electrode active material composite is primarily coated on the mesh electrode current collector 52 having a relatively low aperture ratio in which the number of openings per inch (ppi) is 100, and then the mesh electrode current collector 53 having a relatively high aperture ratio in which the number of openings per inch (ppi) is 40 is arranged thereon, and next, the negative electrode active material composite is secondarily coated. The positive electrode and the negative electrode are manufactured by the same method as that of Embodiment 1.

21

(Manufacturing of the Electrode Assembly)

A separator including polyethylene (PE) film (manufactured by Toray Co.) is prepared, and as shown in FIG. 3, the electrode assembly is manufactured by sequentially stacking the negative electrode including the manufactured mesh electrode current collector, a separator, the manufactured positive electrode, a separator, the manufactured negative electrode, a separator, the manufactured positive electrode, a separator, and the negative electrode including the manufactured mesh electrode current collector.

(Manufacturing of a Lithium Secondary Battery)

A pouch-type lithium secondary battery is manufactured by inserting the electrode assembly in a pouch-type case, and then injecting electrolyte including lithium salt of 1.3 M LiPF$_6$ to solvent in which ethylene carbonate (EC), ethyl methyl carbonate (EMC), and dimethyl carbonate (DMC) are mixed at a volume ratio of 1:1:1.

Comparative Example

A lithium battery is manufactured by the same method as that of Embodiment 1 except that a negative electrode is manufactured by using a Cu foil current collector instead of the negative electrode including the mesh electrode current collector.

An appraisal example: a capacity and energy density of a lithium battery are measured.

To determine whether an irreversible capacity is reduced, the lithium secondary batteries manufactured in Embodiments 1 and 2, and Comparative example were charged to a charging cut-off voltage of 4.3 V with a current of 0.2 C rate at 25° C. during a constant current mode (CC mode), and charged until a current becomes 0.05 C rate with a voltage of 4.3 V maintained during a constant voltage mode (CV mode). Subsequently, the lithium secondary batteries were discharged to a discharging cut-off voltage of 3.0 V during a constant current mode of 0.2 C. After that, capacities and energy densities of lithium secondary batteries manufactured in Embodiments 1 and 2 and Comparative example were measured and represented in Table 2 below.

Here, the energy density may be represented as below.

$$\text{Energy density} = \frac{\text{battery capacity } (mAh) \times \text{battery voltage (V)}}{\text{battery volume (L)}} \text{Energy density} =$$

$$\frac{\text{battery capacity } (mAh) \times \text{battery voltage (V)}}{\text{battery volume (L)}}$$

TABLE 2

| | The number of unit stacked bodies | An electrode including a mesh electrode current collector | Capacity (mAh) | Energy density (Wh/L) |
|---|---|---|---|---|
| Embodiment 1 | 1 | Lowermost electrode and uppermost electrode | 79 | 360 |
| Embodiment 2 | 1 | Lowermost electrode and uppermost electrode | 79 | 343 |
| Comparative example | 1 | Non | 75 | 300 |

22

As shown in Table 2, it is found that Embodiments 1 and 2 in which the lowermost electrode and the uppermost electrode include the mesh electrode current collector, have excellent capacity and energy density compared to Comparative example in which there is no electrode including the mesh electrode current collector.

INDUSTRIAL APPLICABILITY

The present disclosure is applicable to a battery as an energy source that is chargeable and dischargeable, and various apparatuses that use the battery as a driving power source.

The invention claimed is:

1. A stacked electrode assembly, comprising;
a first electrode at a first portion of the stacked electrode assembly;
a second electrode at a second portion of the stacked electrode assembly;
a unit stacked body between the first electrode and the second electrode;
a first separator between the first electrode and the unit stacked body; and
a second separator between the unit stacked body and the second electrode,
wherein:
the unit stacked body includes a first positive electrode, a first negative electrode, and a third separator, the third separator being between the first positive electrode and the first negative electrode,
the first electrode includes a first mesh electrode current collector and a second mesh electrode current collector, the first mesh electrode current collector being spaced apart from the second mesh electrode current collector in a thickness direction of the first electrode,
each of the first mesh electrode current collector and the second mesh electrode current collector is surrounded by an electrode active material within the first electrode, the electrode active material layer being directly between the first mesh electrode current collector and the second mesh electrode current collector,
the electrode active material surrounding the first and second mesh electrode current collectors is the same as the electrode active material directly between the first and second mesh electrode current collectors, and
the first mesh electrode current collector has openings at different locations or has a different aperture ratio from the second mesh electrode current collector.

2. The stacked electrode assembly as claimed in claim 1, wherein the second electrode includes a third mesh electrode current collector and a fourth mesh electrode current collector, the third mesh electrode current collector being spaced apart from the fourth mesh electrode current collector in a thickness direction of the second electrode.

3. The stacked electrode assembly as claimed in claim 1, wherein the first electrode includes the electrode active material on one side of the first mesh electrode current collector.

4. The stacked electrode assembly as claimed in claim 3, wherein the first electrode includes the electrode active material on two opposite sides of the second mesh electrode current collector.

5. The stacked electrode assembly as claimed in claim 1, wherein the first electrode has an asymmetric shape in which a thickness of the electrode active material located on one side thereof is different from a thickness of the electrode active material located on another side thereof.

6. The stacked electrode assembly as claimed in claim 4, wherein the first electrode includes the electrode active material inside an opening of each of the first mesh electrode current collector and the second mesh electrode current collector.

7. The stacked electrode assembly as claimed in claim 1, wherein:

the first electrode includes a third mesh electrode current collector, which is spaced apart from each of the first mesh electrode current collector and the second mesh electrode current collector in the thickness direction of the first electrode, the first mesh electrode current collector is between the second mesh electrode current collector and the third mesh electrode current collector, and the second and third mesh electrode current collectors have openings at different locations or have different aperture ratios from the first mesh electrode current collector.

8. The stacked electrode assembly as claimed in claim 1, wherein, in the unit stacked body, each of the first positive electrode and the first negative electrode includes a non-porous electrode current collector and an active material arranged on at least one side of the non-porous electrode current collector.

9. The stacked electrode assembly as claimed in claim 1, wherein the unit stacked body has a bi-cell structure stacked in a sequence of one of:

the first negative electrode, the third separator, the first positive electrode, a fourth separator, and a second negative electrode, and the first positive electrode, the third separator, the first negative electrode, a fourth separator, and a second positive electrode.

10. The stacked electrode assembly as claimed in claim 1, wherein each of the first mesh electrode current collector and the second mesh electrode current collector has a metal mesh shape in which a plurality of openings are arranged two-dimensionally.

11. The stacked electrode assembly as claimed in claim 1, wherein the first mesh electrode current collector and the second mesh electrode current collector each include at least one of Al, Ti, V, Cr, Mn, Fe, Co, Ni, Cu, Zn, Zr, Nb, Ag, W, Pt, stainless steel, or a combination thereof.

12. The stacked electrode assembly as claimed in claim 1, wherein each of the first mesh electrode current collector and the second mesh electrode current collector has a thickness of 10 μm to 500 μm.

13. The stacked electrode assembly as claimed in claim 1, wherein a number of openings (ppi) of the first mesh electrode current collector is 30 or more per inch, or an aperture ratio of the first mesh electrode current collector is 40% or less.

14. The stacked electrode assembly as claimed in claim 13, wherein a number of openings (ppi) of the second mesh electrode current collector is 30 or less per inch, or an aperture ratio of the second mesh electrode current collector is 40% or more.

15. The stacked electrode assembly as claimed in claim 1, wherein the first mesh electrode current collector contacts an outer surface of the unit stacked body.

16. The stacked electrode assembly as claimed in claim 15, wherein the second mesh electrode current collector contacts an outer surface of the unit stacked body.

17. A lithium battery, comprising:

the stacked electrode assembly as claimed in claim 1.

18. The stacked electrode assembly as claimed in claim 6, wherein:

the electrode active material completely surrounds the second mesh electrode current collector, and the electrode active material covers only the one side and inside the opening of the first mesh electrode current collector.

19. The stacked electrode assembly as claimed in claim 1, wherein an edge of the first mesh electrode current collector facing the unit stacked body is coplanar with an edge of the first electrode facing the unit stacked body, the first mesh electrode current collector having a lower aperture ratio than the second mesh electrode current collector.

20. The stacked electrode assembly as claimed in claim 1, wherein the electrode active material directly between the first and second mesh electrode current collectors includes a same material in an entire space between facing surfaces of the first and second mesh electrode current collectors.

* * * * *